Nov. 14, 1967　　　R. A. KRAUS ETAL　　　3,351,978
APPARATUS FOR MOLDING FOAMED PLASTIC CUPS
Filed Jan. 18, 1965　　　　　　　　　　　　5 Sheets-Sheet 1

INVENTORS
ROBERT A. KRAUS
EDMUND J. KRAUS
BY

ATTORNEYS

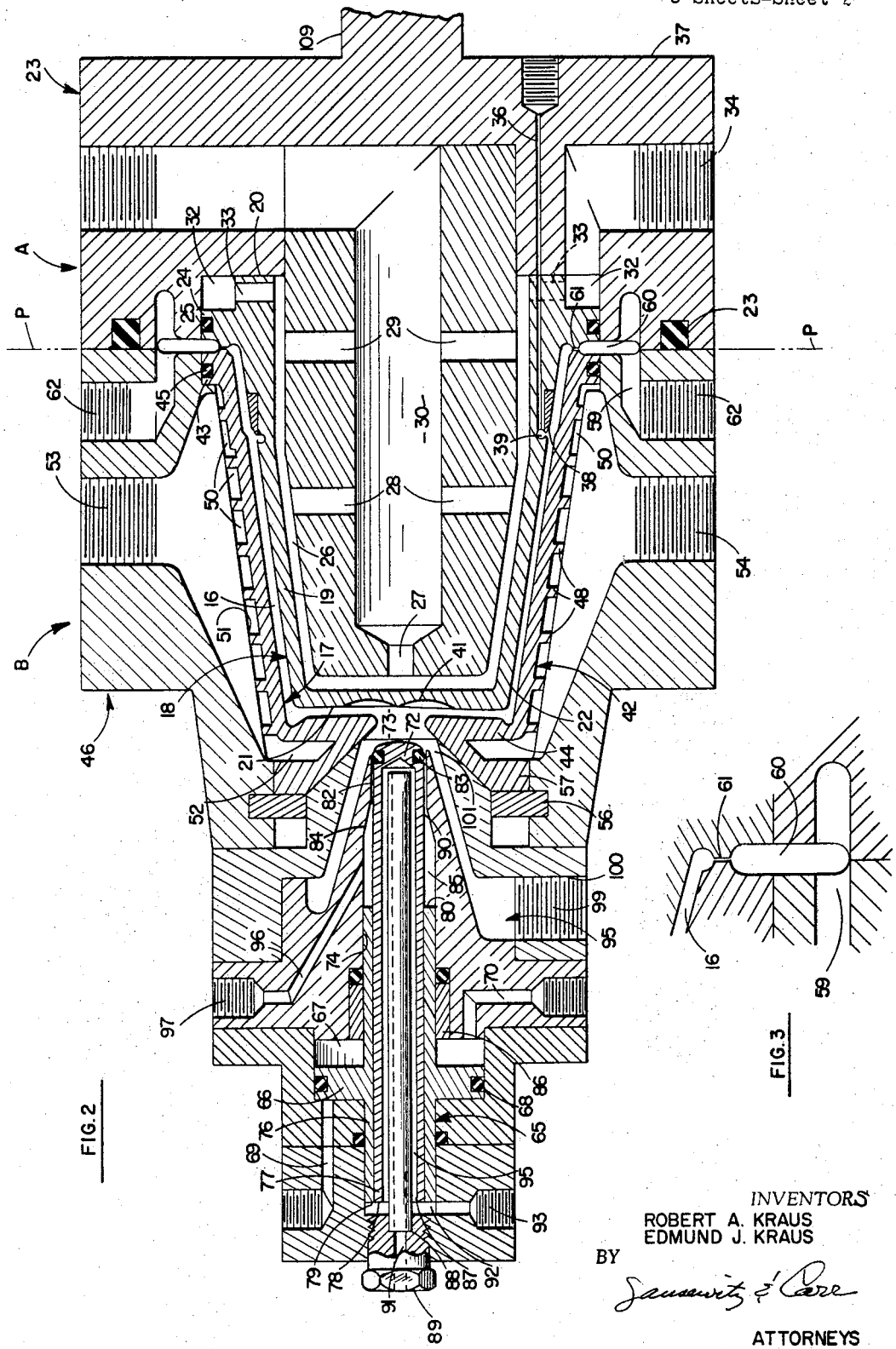

INVENTORS
ROBERT A. KRAUS
EDMUND J. KRAUS

ATTORNEYS

Nov. 14, 1967  R. A. KRAUS ET AL  3,351,978
APPARATUS FOR MOLDING FOAMED PLASTIC CUPS
Filed Jan. 18, 1965  5 Sheets-Sheet 4
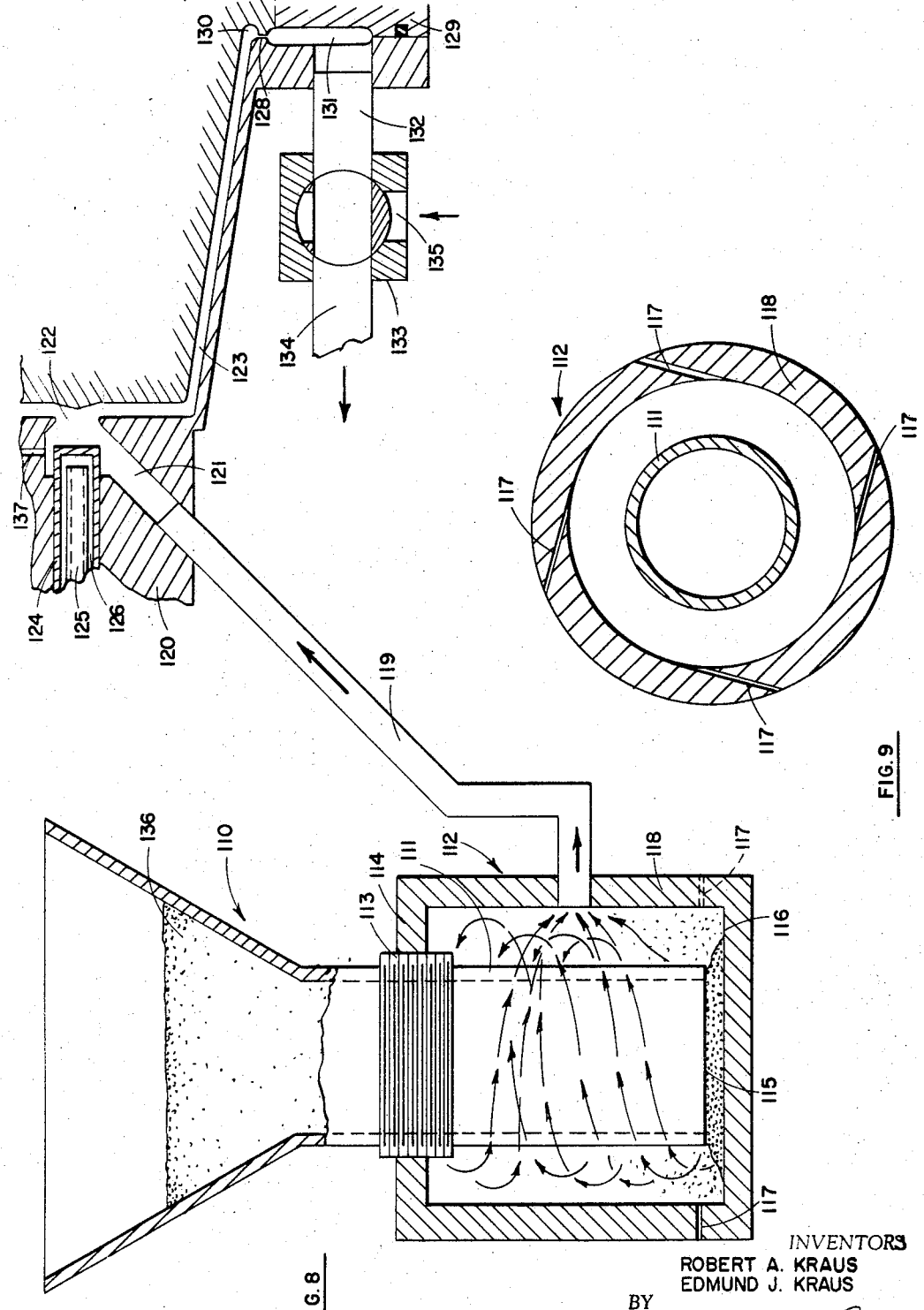
INVENTORS
ROBERT A. KRAUS
EDMUND J. KRAUS
BY
ATTORNEYS

United States Patent Office

3,351,978
Patented Nov. 14, 1967

3,351,978
APPARATUS FOR MOLDING FOAMED
PLASTIC CUPS
Robert A. Kraus and Edmund J. Kraus, Monrovia, Calif.,
assignor, by mesne assignments, to Cupples Container
Company, St. Louis, Mo., a corporation of Missouri
Filed Jan. 18, 1965, Ser. No. 426,234
2 Claims. (Cl. 18—5)

This application is a continuation-in-part of our copending application Ser. No. 22,165, filed April 14, 1960, for Apparatus for Forming Thin Wall Articles of Manufacture From Expandable Fusible Plastic, now Patent No. 3,167,811.

This invention relates to the manufacture of foam plastic articles and more particularly to an improved arrangement for manufacturing thin-walled articles such as cups from granular plastic material.

During recent years expandable or foamable plastic materials have been developed which have properties peculiarly adapted to the manufacture of containers such as cups and food containers. Such expandable plastic materials are available in the form of small beads containing an expanding agent under various trade names such as Pelaspan, which is a trademark of Dow Chemical Co., and Dylite, which is a trademark of Koppers Company, Inc. The most commonly available expandable plastics of this type are formed of chemicals such as polystyrene or the like and are formed as beads containing a foaming or charging agent such as methylchloride, butane, heptane or the like. Normally the plastic material is supplied as small beads which are impregnated with the foaming agent and are of a size which varies from the manufacture but is of the order of sixty to seventy-thousandths of an inch in diameter. When the beads are confined in a retaining mold and heated, they expand and adhere together to form a unicellular rigid material. The desirable characteristics of the material which make them particularly adapted to the manufacture of containers for liquids and foodstuffs includes a low thermoconductivity, low water adsorption, low densities, a lack of odor, and the fact that they have no toxicological effect. Thus, for example, cups formed of such material are particularly desirable for containing hot or cold liquids since the heat-insulating properties of the material will retain the temperature of the liquid contained therein relatively constant. In addition, unlike various paper cups formed of paper or other pulp products, no taste is imparted to the liquid contained. In addition, the material is sufficiently inexpensive that the cups may be made disposable and manufactured as an item which is intended to be disposed of after one use. The characteristics of the material make it possible to dispose of the cup by smashing or fracturing with no danger of cutting or harming the user.

However, in the manufacture of such containers and other intricate shapes from the foamable polystyrenes, manufacturing difficulties are encountered which are of a nature peculiar to the material itself and prior art apparatus for forming intricate shapes from the material have had various disadvantages for mass production or economical production of intricate shapes such as cup-shaped articles. The apparatus of the present invention is intended to provide an economical means for forming shapes of finished unicellular articles of such material. The apparatus of the present invention is particularly adapted to the manufacture of cups for holding liquids and foodstuff and will accordingly be described throughout the following specification in connection with such use. It is to be understood, however, that the various novel features of the present invention are not limited to the manufacture of cups, containers or any particular article of a particular shape, but rather are adaptable to the manufacture of many different products. For clarity of description, however, the manufacture of cups is utilized as an example of the utility of the present invention.

Among the various characteristics of the material which produce manufacturing problems is the fact that the material is not easily flowable and if heated in a mold without even dispersion of the unexpanded material throughout the mold a uniform density in the finished article will not be obtained. Among other reasons for the difficulty in flow is the low density of the material and the fact that prior to heating it occupies a much lesser volume than after heating. In addition, the material has a tendency to be statically electrically charged such that the particles will have some cohesion one for the other and will not easily flow into small spaces. Also, in manufacturing bodies from such expandable plastic beads, which bodies are of intricate shape or have thin vertical section, it is necessary to prefoam the material to partially increase its size. That is, prefoaming the material to partially increase its size. That is, prefoaming or pre-expansion is a controlled partial expansion of the expandable beads. Such prefoaming must be carried out in order to assure complete expansion of the material and to obtain uniform densities and cohesion between the various beads. The prefoaming operation causes the beads to be expanded to a size at which the above-mentioned difficulties are magnified. Thus, such beads can be utilized to manufacture a structure having a discrete closed cellular wall which is impervious to moisture, if the beads can be uniformly distributed throughout a mold and heat applied thereto.

The present invention includes an improved arrangement for filling the mold cavity so that the plastic beads will be uniformly distributed in exactly the right quantities to produce a quality thin-walled article. In general, this is accomplished by causing the beads to flow into the mold by creating a vacuum within the cavity. The mold is evacuated through an opening too small for the beads to pass through. The beads are drawn into the mold freely and will pass through the narrow mold passages without difficulty under the influence of the suction force. In this manner, all portions of the cavity become occupied by the beads in a uniform dispersion, after which the entrance to the cavity is closed and the mold is heated to expand and fuse the beads. Filling the mold in this manner automatically introduces the exact quantity of beads needed without premeasurement. The vacuum draws the beads into the cavity much more rapidly and creates a more uniform distribution than would be possible with a gravity feed or other arrangement. This also means that the molding equipment need not be oriented in any particular manner to cause the material to flow by gravity, but may be positioned for optimum performance and convenience without regard to gravitational forces. Moreover, the reduced cavity pressure assists in the expansion of the beads, assuring complete fusion even where the beads may have deteriorated from storage and the blowing agent accordingly produces a lesser pressure within the beads.

When the mold cavity is closed, the beads remaining in the inlet passageway are blown back to a supply hopper. This means that the excess beads will not remain adjacent the mold and so will not become heated as the mold temperature is raised. Hence, these beads will not become prematurely expanded nor will they adhere together before their time to be fed into the mold. As a result, the beads are all usable and the mold inlet passages do not become clogged. Thus, despite the simplicity of the vacuum mold filling arrangement, only the precise quantity needed will enter the mold, and the excess is removed from the vicinity of the mold during the heating and fusion step.

After the beads in the mold cavity have been expanded and fused, the mold is chilled to solidify the plastic. Following this, the mold is separated and the completed part removed. The result is a part of superior properties produced in a minimum amount of time by relatively simple equipment incorporating a minimum number of moving parts.

Accordingly, it is an object of the present invention to provide an improved apparatus for forming finished articles from fused expandable plastic beads.

It is another object of the present invention to provide such an apparatus wherein the plastic beads can be automatically and uniformly fed to the cavity in the closed condition of the cavity.

It is a still further object of the present invention to provide such a molding apparatus which is entirely automatic in operation.

It is yet another object of the present invention to provide such a molding apparatus by means of which a measured quantity of such beads are fed to the mold apparatus to insure uniform filling of the cavity prior to expansion and fusion thereof.

Yet another object of the present invention is to provide such an apparatus which fills the mold cavity with a measured amount of such expandable plastic beads and automatically removes from the vicinity of the mold any excess materials in order to prevent the unwanted expansion and fusion of such materials.

It is a still further object of the present invention to provide such a mold apparatus which is simple and economical in use and which can be utilized over repeated molding operations and for continuous length of time.

It is yet another object of the present invention to provide such an automatic molding apparatus which has a short cycle of operation for maximum production of such structures in any given length of time.

It is another object of the present invention to provide an automatic molding apparatus which can be oriented in the position most feasible for production purposes.

An additional object of the present invention is to provide an automatic molding apparatus for forming objects of expandable plastic beads wherein a vacuum is provided in the mold cavity to supply an increased pressure differential between the gas contained in the beads and the exterior thereof.

These and other objects will become apparent from the following detailed description taken in connection with the accompanying drawing in which:

FIGURE 2 is a longitudinal sectional view of the mold assembly utilized in forming the cup of FIGURE 1;

FIGURE 3 is an enlarged fragmentary sectional view illustrating the details of the vacuum outlet for the cavity;

FIGURE 8 is a sectional view of an embodiment utilizing a different plastic feed arrangement in which a swirling current of air keeps the plastic particles separated;

FIGURE 9 is a transverse sectional view, taken along line 9—9 of FIGURE 8, illustrating the openings to the plastic container of FIGURE 8.

Figure 1:
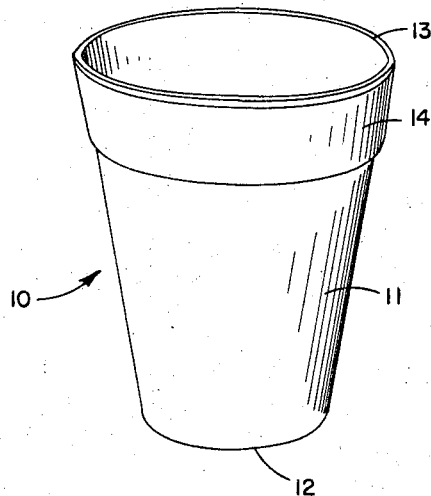
FIGURE 1 is a perspective view of a typical thin-walled article in the form of a cup, produced in accordance with this invention.

The arrangement of this invention is used in producing a thin-walled article from fused expanded foam plastic beads, such an article typically being a cup 10 such as shown in FIGURE 1. This cup includes a frustoconical side wall 11 flaring outwardly from the bottom 12 toward the lip 13 at the top edge. The upper portion of the side wall may be slightly enlarged in diameter as shown.

The expandable plastic beads as obtained from the manufacturer are designated as raw beads and can be purchased in various sizes. In the present use of this invention, such beads are pre-expanded in accordance with standard molding procedures heretofore known to the art to a diameter at which they will fill the mold uniformly in the proper quantity for a finished wall, as more fully described hereinafter. In the prefoamed condition, if the plastic beads are contained within a closed volume such as a cup-shaped cavity and subjected to heat, the beads will further expand under such temperature and will cause an internal pressure to be created. During the final expansion of the beads they will totally and uniformly fill the cavity and will fuse together to form a liquid-impervious wall.

Referring now particularly to FIGURE 2, one of the molds constructed in accordance with the present invention is shown in detail and includes in general a male portion and a female portion which are separable along a parting line P in FIGURE 2. The male portion is designated generally as A, while the female portion is designated generally as B. The mold is separable at the parting line P by moving the male portion A of the mold and the female portion B of the mold relative to one another along the longitudinal axis of the mold. The mold cavity 16 is defined by the internal wall 17 of the female mold element and the external wall 18 of the male mold element, which walls are substantially parallel and spaced apart by the wall thickness desired in the finished structure. The cavity thus defined is complementary to the finished cup 10 shown in FIGURE 1. The male mold element A may include an inner part 19 that extends from a transverse shoulder 20 at the larger end to a transverse bottom surface 21 at the smaller end, with the side wall 22 of this mold portion being of frustoconical configuration.

The inner mold element 19 is connected to the outer mold housing element 23 at the flange 24, and there is a gas-tight seal between them supplied by an O-ring 25 in a suitable O-ring groove. The mold portion 19 is provided with internal fluid passages in the form of an annulus 26, which annulus is connected by various passages 27, 28 and 29 to a central fluid-flow conduit 30. The latter passage, in turn, is in communication with the exterior surface of the mold body, and is threaded in order to be fitted with a fluid inlet line (not shown) as described more particularly hereinafter. An annulus 32 is defined by the male portion 23 in communication with the passageway 26 through a plurality of fluid ports 33 extending through the right-hand portion of the male mold element 19. The annulus 32 connects to a fluid outlet passage 34, which is threaded at its outer end for connection to a fluid outlet line.

In addition, the male mold sections 19 and 23 define a plurality of air inlet passages 36 extending from the outer end 37 of the mold inward and through the wall of the male mold to a position proximate the shoulder 38 in the mold cavity 16. An annular groove 39 is formed in the exterior side wall 22 at the shoulder 38 such that an annular opening is defined between the passageway 36 and the mold cavity 16. This opening is narrower than the diameter of the plastic beads used in forming the cup 10. Thus, as more fully described hereinafter, air injected through the opening 36 and through the opening 39 will form an ejection stream of air for removing the finished structure from the male mold when it adheres thereto. By blowing between the cup and male mold, the cup is expanded slightly for easy removal of the cup from the male mold.

At this point it should be noted that preferably the end surface 21 of the male mold element 19 is not planar but is provided with a concave annular indentation 41 emanating from the center axis of the bottom wall 21. That is, an indentation is provided in the surface 21 which is symmetrical about the longitudinal axis through the apparatus, and which curves radially from the axis by describing a concavity extending from the high point at the axis as shown in FIGURE 2. As will become more apparent hereinafter, this surface provides a means for causing the plastic beads which impinge upon the surface 21 to be dispersed radially and, in effect, imparts the necessary flow to the beads, causing the beads to be spread radially outward from the axis rather than piling up at this point.

The female mold B includes an inner portion 42 having the cavity surface 17 which is similar in configuration to the male element, but is spaced therefrom such that the inner wall 17 defines the exterior wall of the mold cavity 16. The female mold part 42 is continuous in configuration and symmetrical about the longitudinal center line of the apparatus with a flanged larger end 43 adjacent the parting line P. It also includes an opposite end wall 44 defining the bottom surface of the mold cavity 16. A sealing ring 45 is provided in the circumferential surface of the flange 43 to form a sealing engagement with the outer mold body 46.

A series of transversely extending circumferential baffles 48 are formed upon the outer surface of the side wall 49 of the female mold element to define fluid circulating paths 50. That is, in the presently preferred embodiment, a series of equally spaced-apart circumferential baffles 48 are formed upon the outer surface of the wall 49 and are of substantially equal height. In the embodiment shown, eight such baffles are used. Thus, the female mold element 42 is affixed within the female body portion 46 of the molding apparatus, which is that portion to the left of the parting line P. The mold body 46 defines a frusto-conical opening defined by the wall 51, which conforms to the configuration of the exterior wall 49 of the female mold element 42 but is spaced therefrom to define the fluid-flow cavities 50. The wall 51 is spaced from this surface 49 by an amount approximately equal to the height of the baffles 48. In addition to the plurality of circumferential fluid paths 50 defined between the baffles 48, there is a fluid groove 52 beyond the end wall 44 that provides an additional fluid path which passes over the outer surface of the end wall 44. A fluid inlet conduit 53 is provided from the upper surface of the mold body 46 and is threaded for the connection of a fluid inlet line. The fluid inlet conduit 53 is expanded longitudinally at the upper inlet portion of the fluid passages in order to span the plurality of annular passages 50 and distribute fluid to each. Thus, at the upper portion of the mold body, the fluid inlet passage 53 is, in effect, fan-shaped and is in fluid communication with the fluid groove 52 and each of the fluid annular passages 50.

Similarly, a fluid outlet conduit 54 is provided at the lower portion of the mold body 46 and is threaded for connection to a fluid outlet line. Like the inlet passage 53, the fluid outlet passage 54 is expanded longitudinally to provide fluid communication with the fluid groove 52 and each of the fluid annular passages 50. Thus, fluid passing into the mold body 46 will flow through the longitudinally expanded portions of the fluid inlet and into each of the annulus passages 50, where it will progress over the walls 49 and 44 into the fluid outlet passage 54.

The female mold element 42 is affixed to the mold body 46 by suitable means such as a mounting ring 56 which is positioned within the mold body with a flange extending radially inward to engage the annular lip 57 of the member 42.

The body portion of the mold apparatus also defines at the parting line a vacuum annulus 59, which is in communication with the cavity 16 at the parting line P. That is, as shown particularly in FIGURE 2, an annular cavity 59 is defined by the mated male 23 and female 46 body portions of the mold apparatus. The annulus 59 is of substantial width and narrows down to a decreased area 60 extending between the flanges 24 and 43 of the male mold element and female mold element, respectively. At the radially innermost point of the vacuum annulus 59 a small circumferential passage 61 is provided to allow the passage of air from the mold cavity 16 to the vacuum annulus 59. The width of the air passage 61 when the mold apparatus is in the mated condition is such that it is too small to allow the passage of the plastic beads therethrough. Thus, if a vacuum is created in the vacuum annulus 59, it will extract air from the mold cavity 16 but will not permit the passage of the plastic beads from the mold cavity to the vacuum annulus. A vacuum inlet conduit 62 is provided through the body portion of the mold apparatus into communication with the vacuum annulus 59.

When the mold bodies are mated, the vacuum annulus 59 is closed annulus in communication with the mold cavity 16. When a vacuum pump is connected to the air line (not shown) which is threadably connected to the air conduits 62, the vacuum drawn in the annulus 59 extracts air from the mold cavity and reduces the ambient air pressure therein without allowing the escape of the plastic beads therefrom.

In the female body portion 46 of the mold apparatus there is provided a reciprocating plunger assembly 65, which is reciprocally mounted along the longitudinally center line of the mold apparatus. The plunger 65 includes a transversely extending flange which defines a piston 66 positioned within the cavity 67 defined in the mold body. The cavity 67 is thus a cylinder which is substantially longer than the thickness of the flange in order to allow longitudinal movement of the flange or piston 66 therein. The outer diameter of the piston 66 is in sliding contact with the cylindrical wall of the cylinder 67 and is sealed with respect thereto by means of an O-ring 68.

An air inlet port 69 is provided through the mold body extending from the exterior thereof to a position at the left side of the cylinder 67 in FIGURE 2 such that air under pressure admitted through the passage 69 will exert a force upon the piston in the direction toward the mold cavity. Similarly, the second air inlet port 70 is provided through the mold body in communication with the cylinder 67 at the position to the right of the piston in FIGURE 2 such that air or fluid admitted through the passage 70 will force the piston 67 to the left in FIGURE 2. Threaded connecting means are provided for the air passages 69 and 70 for the connection of air lines to the passages.

The plunger 65 is adapted at the inner end 72 thereof to mate with the opening 73 through the end wall 44 of the female mold element 42. The plunger 65 is in general an elongated cylinder with the piston 67 extending radially therefrom. The plunger 65 to the right of the piston 67 is longitudinally movable within the cylinder 74 formed in the mold body symmetrically about the longitudinal center line thereof.

As illustrated, the plunger includes a sleeve 76, which has an outside diameter substantially equal to the inside diameter of the cylinder 74 and is in sliding contact therewith. Positioned within the sleeve is an elongated cylinder 77 having an outside diameter approximately equal to the inside diameter of the sleeve 76. The tubular plunger sleeve 77 is of substantially greater length than the sleeve 76 and is affixed thereto such that the left-hand ends 78 and 79 of the two elements are substantially coincident. Because the plunger cylinder 77 is of considerably greater length than the length of the sleeve 76, the sleeve defines a transversely extending shoulder 80 at the forward (right-hand) end thereof which is well within the cylinder 74. The tubular plunger 77 extends forwardly of the shoulder 80 to the inner end 72 of the plunger assembly. At its inner end 72, the plunger is closed.

The cylinder 74 within which the plunger is longitudinally movable is reduced in diameter proximate the inner end 82 thereof to provide a cylindrical portion having an inside diameter substantially equal to the outside diameter of the plunger 77 which is in sliding contact therewith. An O-ring or similar sealing means 83 is provided between the outside diameter of the plunger 77 and the inside diameter of the reduced cylindrical portion 82. The cylinder 74 of larger diameter is connected to the cylinder portion 82 of lesser diameter by a convergent wall 84 which is spaced substantially to the right of the shoulder 80. Thus, an annular cavity 85 is defined between the mold body and the plunger 77 which extends longitudinally from the shoulder 80 to the cylinder portion 82. The longitudinal extent of the cylinder portion 82 is such that it is greater in length than the longitudinal travel of the plunger assembly 65.

Suitable bearing and sealing means 86 are provided at the interior wall of the mold body in sliding bearing contact with the sleeve 76 of the plunger assembly to allow continuous sliding movement of the plunger within the cylinder without undue wear and to provide a seal between the mold body and the cylinder 67.

The plunger 77 is tubular with the inner end 72 being closed, but with an open rearward end 87. Positioned within the tubular opening of the plunger is a fluid conduit 88 which is affixed to the mold body by means of a threaded plug 89. The tubular conduit 88 is stationary with respect to the plunger assembly 65, and extends inwardly into the plunger to a position at which its inner end 90 is proximate the inner end 72 of the plunger portion 77. However, the inner end 90 of the conduit 88 is spaced from the end 72 of the plunger portion 77 by a distance sufficient that the plunger in the retracted position as shown in FIGURE 2 will not be in contact with the inner end 90 of the tubular conduit 88. A fluid path 91 is provided through the plug 89 with suitable fittings for affixing a fluid line thereto. The inner ends 78 and 79 of the plunger and sleeve are spaced from the fitting 89 by a distance which is sufficient at the retracted position of the plunger to provide a fluid-flow annulus 92 which is in communication with a fluid outlet port 93. The fluid outlet port 93 is again provided with a threaded portion 94 to which a fluid outlet line can be connected.

Thus, a fluid-flow path is provided such that fluid is admitted through the fitting 89 along the fluid path 91 and thus through the length of the tubular conduit 88. From the inner end 90 of the conduit 88, the path continues to the annular space 95 defined between the tubular conduit 88 and the inner wall 96 of the plunger 77. Fluid will thus flow into the annular space and will counterflow to the fluid annulus 92 and thence from the mold body through the fluid outlet port 93. Accordingly, fluid can be conducted from the fitting 88 to the inner end 72 of the plunger assembly, and from the assembly through the fluid outlet port 93.

It should be noted at this point that the plunger assembly, including the plunger 77 and the sleeve 76, is longitudinally movable from an extended position, at which the inner end 72 of the plunger is substantially coincident with the opening 73 through the end wall 44 of the female mold element 42, to the retracted position shown in FIGURE 2 at which the plunger is substantially removed from the end wall 44 and out of contact therewith by a substantial distance. At the retracted position, the sealing means 83 is in sealing contact with the lesser diameter of cylinder 82 such that the annular space 85 defined by the outer surface of the plunger 77 and the interior wall of the cylinder 74 is a sealed and closed cavity. At the extended position, however, the sealing means 83 is removed from the cylinder 82 such that an air passage exists from the cavity 85 through the cylinder 82 and to the exterior of the cylinder. Accordingly, an air path exists from the cavity 85 to the plastic feeding cavity 95 as described hereinafter. An air path 96 is defined through the mold body 46 from the exterior thereof at the threaded fitting 97 in communication with the annular cavity 85 surrounding the plunger proximate the inner end thereof between the shoulder 80 and the reduced diameter 82 of the cylinder. Thus, air can be injected into the cavity 85 and outward therefrom at the inner end of the cylinder through the space defined by the inner diameter 82 of the cylinder and the outer wall of the plunger when the sealing means 83 is extended from the cylinder 82.

The plastic feeding path 95 includes an opening 99 defined through the mold body which extends from the exterior thereof radially inward. This opening 99 is provided with threads 100 for the connection of a conduit thereto. The opening 99 is in communication at its inner end 101 with the opening 73 through the end wall 44 of the female cavity 42. More particularly, the opening 99 into the mold body is spaced to the left in FIGURE 2 from the opening 73 into the mold cavity 16.

It can be seen that, if the plastic beads in their pre-expanded condition are supplied to the flow path 99 when the plunger assembly 65 is in the retracted position as shown in FIGURE 2, the plastic beads will be conducted into the mold cavity 16 under the influence of the vacuum created in the vacuum annulus 59. The beads will flow through the opening 95 and through the opening 73 in the end wall 44 of the female mold element 42. When the plunger is moved to the extended position at which it closes the opening 73 to make a continuous end surface of the mold 16, an air path exists between the air cavity 85 and the plastic flow path 95. When a stream of air is admitted through the passage 96 into the cavity 85, it then progresses outwardly past the plunger and into the plastic feed path 95 to blow any beads remaining therein from the path 95 and out of the proximity of the mold which is to be heated.

When the mold cavity 16 is closed with the predetermined quantity of expandable plastic beads contained therein, and the beads are subjected to an increase in temperature to the temperature at which they expand and fuse, the beads will fuse into a unicellular mass having a configuration of the mold cavity. The molding apparatus is shown in the closed position in FIGURE 2 prior to or during the admission of the plastic beads through the path 95, the opening 73, and into the cavity 16. After the required quantity of beads has been conducted into the cavity and dispersed throughout, the cavity is subjected to a temperature sufficient to cause expansion and fusion of the beads. During this complete operation, i.e., the loading of the beads into the cavity 16 and the heating and fusion thereof, the vacuum is maintained in the vacuum annulus 59 and thus in the mold cavity 16 such that the ambient pressure surrounding the expandable beads is considerably less than atmospheric.

Hot water in a pressurized system may be used as the heating means for raising the temperature of the beads, after which the mold is cooled to allow extraction of the molded cup again by means of coolant water circulated through the fluid passages surrounding the cavity.

In addition to the hot and cold water circulating systems, air lines are necessary for conducting air under pressure into the air inlet ports 69, 70, 96 and 36 of the mold apparatus. These lines are connected respectively to the air inlet ports 69, 70, 96 and 36 through suitable valving. The air lines are then connected to a source of pressurized air. Similarly, a vacuum line is connected to the mold apparatus at the vacuum annulus 59 by means of the threaded openings 62 which are in communication with the annulus. The vacuum line is connected to a vacuum pump to supply a high vacuum within the annulus. In addition, a conduit suitable for transmitting the plastic beads from a pre-expander, which is of the type well known to the art and not shown in connection with the present invention, to the plastic inlet line 99 and into the plastic feeding passage 95.

Figure 4:
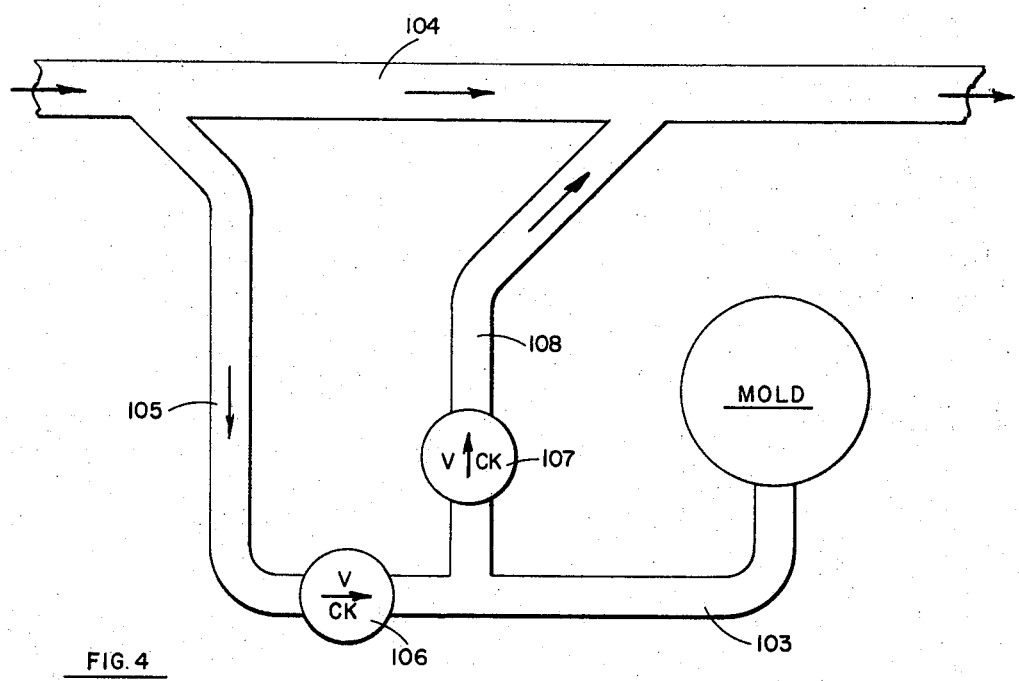
FIGURE 4 is a schematic view showing a form of plastic feeding arrangement.

Thus, referring to FIGURE 4, the plastic conduit 103 is connected at the threads 100 of the mold apparatus and extends from a plastic bead manifold 104 through a plastic inlet line 105 through a one-way flapper valve 106. This permits the passage of the plastic beads from the hopper in which they are stored in the pre-expanded condition, and thence from the flapper valve to the plastic inlet conduit 103 and into the plastic feeding passage 95. A return line is provided between the manifold 104 and the plastic conduit 103, which allows the return of plastic beads which have entered the passage 95 and been removed therefrom as excess material. Thus, beads blown from the passage 95 by air admitted through the air inlet port 96 when the plunger is at the extended position at which it closes the opening 73 are blown from the line 103 and upward through a one-way valve 107 which permits their return to the manifold via line 108 and their circulation back through the pre-expansion hopper.

Figure 5:
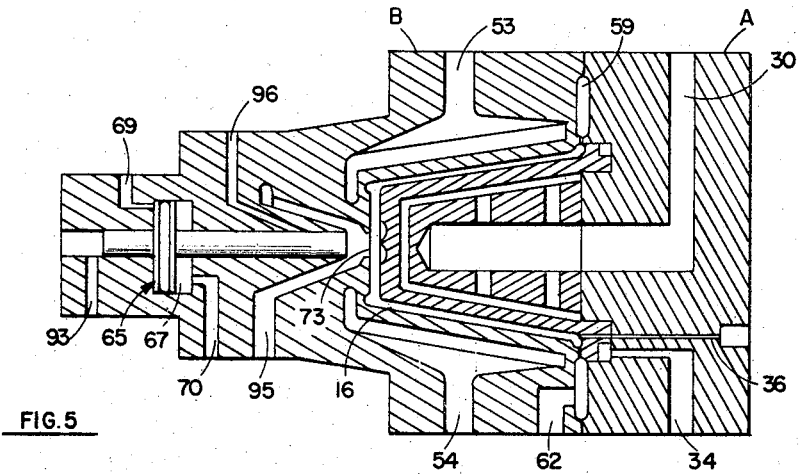
FIGURES 5, 6 and 7 are schematic views illustrating successive steps in forming the cup of FIGURE 1.

Referring particularly to FIGURES 2 and 5, in producing the cup 10 of FIGURE 1, the mold apparatus is mated by bringing the female portion and the male portions thereof into engagement by means of operating mechanisms such as the operating rod 109 which can be reciprocated by a hydraulic piston or other means well known to the art. In FIGURES 2 and 5, the molding apparatus is shown in its mated postion at which it defines the closed cavity 16 into which the pre-expanded plastic beads are to be injected. Thus, the two body portions of the mold are mated at the parting line P and are further urged into the mated position by reason of the vacuum created inside the mold. At this load position, the plunger assembly 65 is in the retracted position which is obtained by admitting air to the air line or path 70, which subjects the inner side of the piston 67 to air pressure, to in turn force the piston toward the left and maintain the plunger assembly at the retracted position. In this position, the plastic feeding passage 95 is in communication with the opening 73 through the end wall 44 of the female mold element. The mold cavity 16 is fully closed except for the opening 73. The vacuum pump is creating a vacuum in the vacuum annulus 59. The vacuum in the annulus extracts air from the mold cavity 16 through the small opening 61. As described in connection with FIGURE 4, the plastic beads are drawn from the manifold 104 which leads from the pre-expansion hopper to provide beads at the one-way check valve 106. With the plunger retracted and the vacuum annulus 59 creating a vacuum in the mold cavity 16, the beads are drawn into the plastic feeding passage 95 and thence through the opening 73 through the end wall of the female mold element 42. As the plastic beads pass through the opening 73, they strike the double concave surface 41 in the end wall surface 21, causing them to be dispersed radially into the bottom portion of the mold cavity 16 and to progress uniformly longitudinally through the mold cavity until they reach the lip of the cavity at the inner end thereof. In this manner, the vacuum in the mold cavity draws the beads into the cavity to completely and uniformly fill it.

Figure 6:
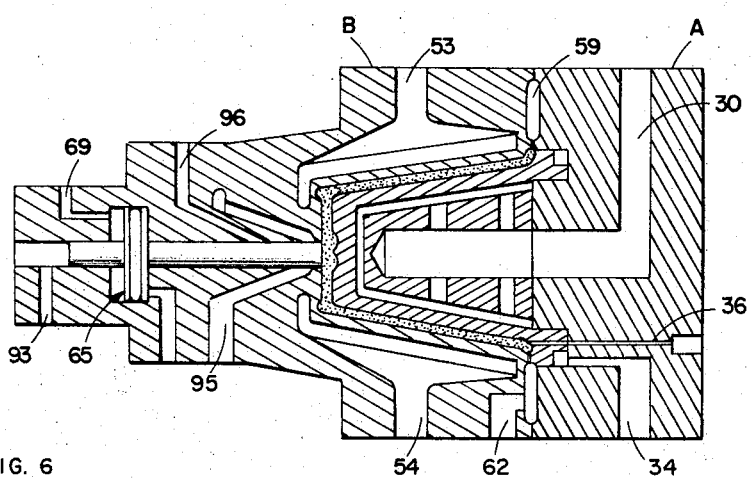
Figure 7:
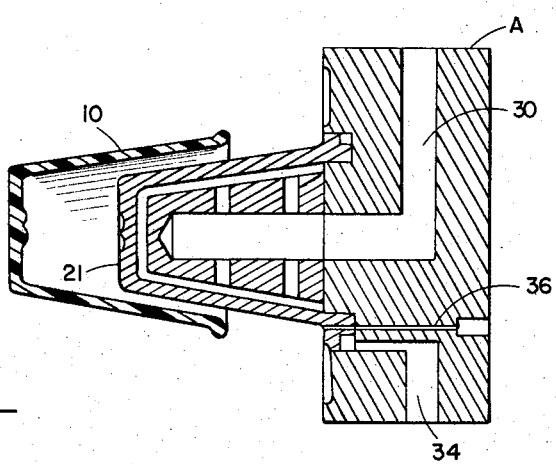

After the proper quantity of pre-expanded plastic beads have passed into the mold cavity 16 to fill the mold cavity, the air pressure in the cylinder 67 is reversed in direction by admitting air under pressure into the air passage 69 at the left side of the piston 66 and venting the cylinder on the opposite side of the piston to the atmosphere to let the air under pressure force the plunger assembly 65 to the position shown in FIGURE 6. At this position, the plunger assembly closes the mold cavity by causing the inner end 81 of the plunger to close the opening 73, as shown in FIGURE 6. Any plastic beads remaining within the plastic feeding passage 95 are then blown therefrom by admitting air through the air passage 96. The beads blown from the passage 95 are blown outward through the plastic conduits 103 and 108, and through the one-way check valve 107 back to the manifold 104 from whence they are returned to the hopper.

The molding apparatus is then in the loaded position at which the mold cavity 16 is fully closed with the proper amount of expandable plastic material therein. No pre-measurement is necessary because the vacuum draws in exactly the right quantity of beads, which is an amount to fill the cavity 16. The beads are drawn rapidly into the cavity, and no reliance need be made on gravity flow. The pneumatic force that is utilized in bringing the beads into the mold is ideally suited for imparting motion to these low density small objects, maintaining a flow of air around the beads that keeps them moving freely to reach all areas of the narrow opening defined by the mold cavity.

The vacuum is continued in the vacuum annulus 59 such that the air pressure within the mold cavity 16 is substantially less than atmospheric. Hot water is then admitted into the molding apparatus at the hot water inlet conduits 30, 53 and 91. Upon passing into the hot water inlet conduit 30, the water progresses through the orifices 27, 28 and 29 and into the hot water annulus 26 at the inner wall of the male mold element, thus heating the male mold element to the required temperature. Simultaneously, the hot water passing inward through the hot water inlet conduit 53 is spread longitudinally and passes into the groove 52 into each of the annulus fluid-flow paths 50 such that it progresses circumferentially around the exterior wall of the female mold element to heat the mold element to the required temperature. At the same time, the hot water passes into the fluid conduit 88 through the inlet 91 and to the inner end 81 of the plunger to heat the end of the plunger to the required temperature. Thus, with the plunger in the extended or closed position at which it forms the remainder of the closed surface of the mold cavity, all of the mold cavity defining surfaces are heated to the required temperature by the hot water. The hot water is left in the mold apparatus for the time required to heat the expandable plastic beads to the required temperature.

After the plastic material has expanded and fused, the hot water within the molding apparatus is replaced with a flow of cooling water through the same flow path as previously described, by which it surrounds the mold element to reduce the temperature of the mold cavity 16. During the heating and cooling portions of the operating cycle the apparatus remains as shown in FIGURE 6 with the mold cavity closed but with the vacuum operating in vacuum annulus 59 such that the cavity is constantly subjected to the decreased ambient pressure. At the end of the cooling cycle, the plastic material will have fused and formed the cup as shown in FIGURE 1.

The vacuum in the annulus and cavity is then released, after which the mold apparatus is opened by retracting the male portion from the female portion by means of the operating rod 109. When the male portion is retracted, the cup will be retained thereon. Accordingly, when the mold has been separated, air is admitted through the air line 36 which projects the air into the small annular groove 39. Air passing outward from the groove flows between the male mold wall and the inner wall of the cup to force the cup from the male mold element and thus to eject it from the molding apparatus. At this point, the molding cycle has been completed and the apparatus is ready for another production cycle.

A different arrangement for retaining the beads that are to be introduced into the mold is illustrated in FIGURES 8 and 9. Here, the beads are introduced into a funnel 110 the lower portion 111 of which extends downwardly into a container 112, which is cylindrical and has its axis substantially vertical. The funnel includes a threaded section 113 which fits in a threaded opening in the top wall 114 of the container 112, thereby holding the funnel in position. In this manner, the bottom end 115 of the funnel can be set at a predetermined distance above the bottom wall 116 of the container 112, with the threaded connection permitting this spacing to be varied as desired. Normally, the end 115 is around ⅛ inch above the bottom wall 116.

A plurality of openings 117 extends through the cylindrical side wall 118 of the container 112, these openings being inclined so that they are substantially tangential to the inner surface of the wall 118. The openings 117 are near the bottom of the container 112, and are smaller in diameter than the diameter of the beads that are retained in the container 112.

At approximately the midpoint axially of the wall 118 a conduit 119 extends from the container 112 to the female segment 120 of the mold. The conduit 119 empties into a passageway 121 in the mold which, through opening 122, communicates with the mold cavity 123. Within the mold section 120 is an axially movable plunger 124 that is actuated by a piston 125 to close off the opening 122 when the mold cavity 123 is filled. As before, the plunger 124 includes a central water inlet tube 126 through which the heating and cooling fluid is introduced around which is an outlet passage 127 for this fluid.

At the right-hand end of the mold there is a gap 128 between the adjacent surfaces of the female mold section 120 and the male mold portion 129, communicating with the mold cavity at the enlarged annular portion 130 of the cavity that defines the lip of the cup that is to be produced within the mold. The gap 128, typically of .005 inch to .008 inch thickness, extends to an annular chamber 131 to which, in turn, is connected a line 132. Flow through the line 132 is controlled by a three-way valve 133. In the illustration of FIGURE 8, the valve is positioned so that the vacuum line 134 is connected through the line 132 to the chamber 131. The valve 133 also can be positioned to block all flow or to open port 135, which is vented to the atmosphere.

The foam plastic beads 136 are introduced into the funnel 110, dropping downwardly to the bottom wall 116 of the container 112. Because the lower end 115 of the funnel is adjacent the wall 116, a small quantity of the beads will lie on the bottom wall 116 free of the funnel. This quantity of beads will be replenished from the funnel when portions of these beads are fed to the mold during operation of the apparatus. With the valve 133 positioned as illustrated, a vacuum will be created in the mold cavity 123. This, in turn, creates a vacuum in the line 119 so that beads are drawn from the container 112 through the line 119 into the chamber 121 to pass through the opening 122 at the left-hand end of the mold cavity 123. Hence, the mold will become filled with the beads, after which the plunger 124 is moved to the right to close off the aperture 122. At this time, pressurized air is introduced through port 137 to blow the beads remaining in the passage 121 and the line 119 back into the container 112. This, as before, is to prevent these beads from becoming heated and possibly fused together as the mold temperature is elevated in producing the completed item in the cavity 123. The apertures 117 provide an air outlet so that the air pressure in the line 137 can be utilized readily in blowing the pellets back into the container.

The openings 117 have a further important purpose. At the time that the pellets are drawn from the container 112 into the mold vacity 123 under the influence of the vacuum in the cavity, air will enter the openings 117 and flow through the container 112, mingling with the beads that pass through the line 119. The inclination given the openings 117, by which they are generally tangential to the periphery of the wall 118, causes the incoming air to rotate in the container 112 substantially as indicated by the arrows. In other words, there is a swirling of the air as it is drawn in through the openings 117, causing a like motion of the pellets of foam plastic within the container. This creates a mixing of the plastic beads, and facilitates the flow of air along with the beads as they move. This, in turn, keeps the beads separated from each other and prevents agglomeration. The result is an improved free movement of the beads through the line 119 and through the narrow passageways of the mold cavity 123. Hence, the possibility of clogging the mold or other passageways is reduced, and the performance of the unit is enhanced.

Of course, upon the reverse flow of air used in blowing the excess beads back into the container 112, a similar swirling of the air takes place so, again, the beads are kept apart and loosened so that they do not stick together in the container 112.

Figure 10:
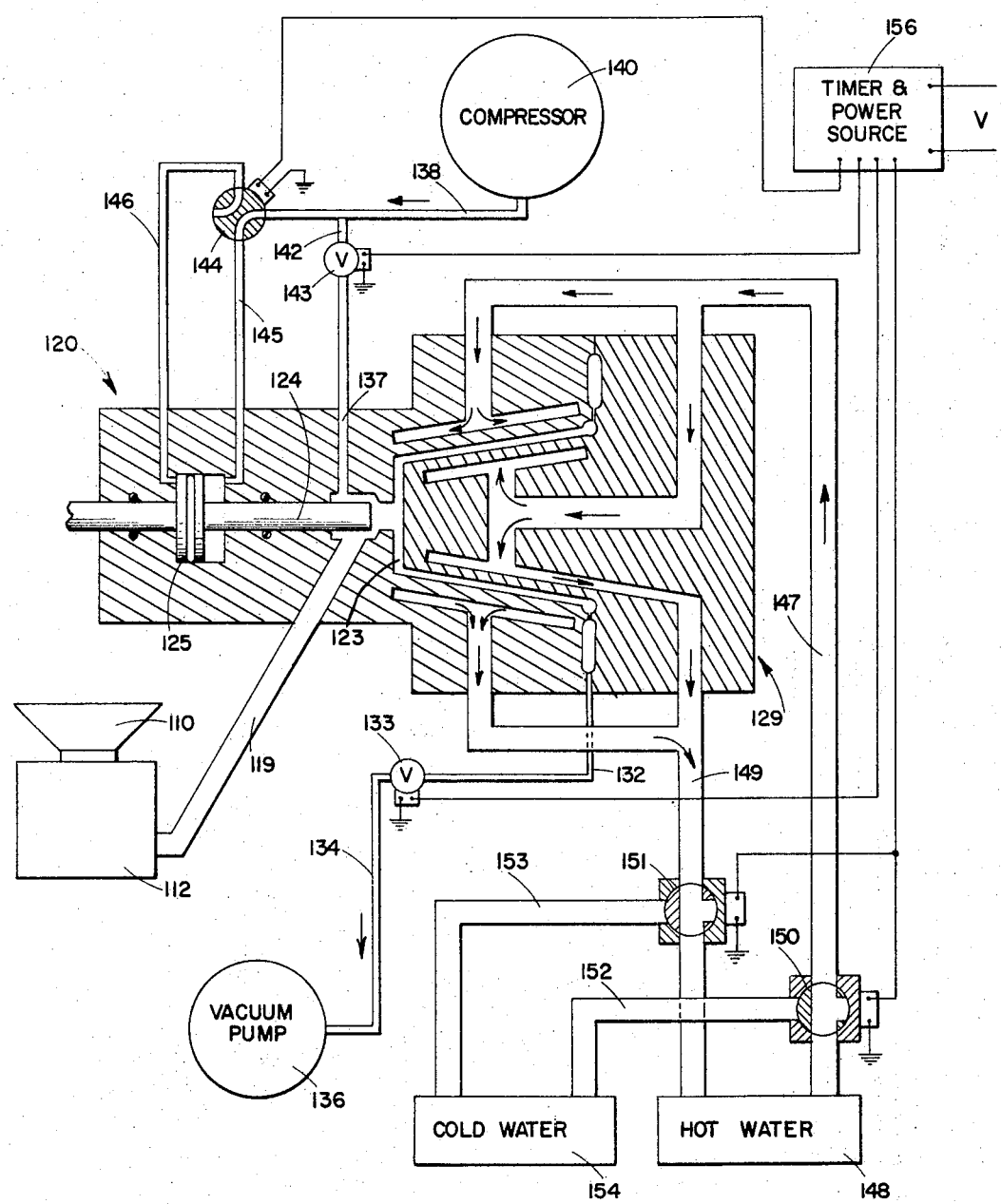
FIGURE 10 is a schematic view illustrating the overall operation of the device of FIGURE 8.

The operation of the controls for the invention may be seen by reference to the schematic view of FIGURE 10. A vacuum pump 139 is connected to the line 134 for lowering the pressure in the mold cavity. Pressurized air is provided by a compressor 140, from which extends a supply line 141 to connect to the plastic return pressure port 137. The line 138 also connects to a four-way valve 144, from which extend a line 145 to the right-hand side of the piston 125, and a line 146 to the left-hand side of the piston 125. Hot water enters the mold through the line 147 extending from the source of hot water 148, returning through line 149. The inlet and return lines 147 and 149 connect also through valves 150 and 151, respectively, to lines 152 and 153 leading to a source of cold water 154. The valves 133, 143, 144, 150 and 151 preferably are power actuated, such as solenoid operated valves, and controlled by an automatic timing device 156.

In operation, therefore, the mold sections 120 and 129 are closed to the position shown, and the valve 144 is positioned so that air from the compressor 140 passes through the lines 141 and 145 to move the piston 125 to the left. At this time the valve 144 also vents the line 146 to the atmosphere. The valve 133 is positioned to connect the cavity 123 to the vacuum pump 139 which evacuates the mold cavity 123, thereby drawing in a quantity of plastic beads through the line 119. The valve 144 then is repositioned so that line 146 is pressurized to move the piston 125 to the right while the line 145 is vented. This moves the plunger 124 to the right, closing the mold cavity entrance opening 122. With the cavity shut, the valve 143 is opened, pressurizing the feed chamber 121 and the line 119, blowing the excess beads back to the container 112. The valves 150 and 151 are positioned to circulate hot wtaer through the mold, which raises the temperature of the beads within the cavity, causing their fusion and expansion. Then the valves 150 and 151 are reversed so that cold water from the source 154 circulates through the mold, chilling the part to solidify it. This completes the cycle so that the mold sections 120 and 129 may be separated for removal of the finished item. Prior to separating the mold, the valve 133 is turned to vent the cavity 123 to the atmosphere so that the vacuum will not tend to hold the mold closed.

The foregoing detailed description is to be clearly understood as given by way of illustration and example only, the spirit and scope of this invention being limited solely by the appended claims.

We claim:

1. Apparatus for molding a cup from foamable plastic pellets comprising a mold defining a cavity complementary to the cup to be produced, said cavity defining a bottom portion for the cup at one end thereof and a lip portion for the cup at the opposite end thereof, said mold having a filling opening therein at the central portion of said one end, said opening communicating with said cavity, said mold having a relatively narrow aperture communicating wtih said cavity at said opposite end;

conduit means connected to said filling opening;

a container for foamable plastic pellets, said container including a cylindrical chamber having a bottom, and a feed tube extending downwardly into said chamber with the lower end of said tube adjacent to but spaced from the bottom of said chamber, said feed tube being adapted to receive a quantity of plastic pellets and cause the pellets to be fed progressively therethrough to the bottom portion of said chamber, said conduit means communicating with the interior of said chamber;

a source of vacuum connected to said relatively narrow aperture for reducing the pressure within said cavity, thereby to cause the plastic pellets to flow from said container through said conduit means and into said cavity to fill said cavity;

a closure member movable between a retracted position remote from said filling opening and a closed position in which said closure member closes said opening, said closure member permitting flow of plastic pellets through said filling opening into said cavity when said closure member is in said retracted position and sealing said filling opening to prevent escape of the pellets from said cavity when said cavity is filled and said closure member is in said closed position;

a fluid passage communicating with said conduit means exteriorly of said cavity adjacent said closure member;

a source of pressurized air connected to said passage for blowing the plastic pellets from said conduit means back toward said container upon movement of said closure member to said closed position;

said container further including air passage means in the cylindrical wall thereof for permitting ingress of air to said chamber, during movement of plastic pellets out of said chamber when the pressure in said cavity is reduced while said closure member is in said retracted position, and egress of air from said chamber, when plastic pellets are blown back toward said container by pressurized air from said source.

2. Apparatus according to claim 1, wherein the axis of said chamber is substantially vertical; and said air passage means includes at least one opening in the cylindrical wall of said chamber adjacent the bottom thereof, said opening being inclined toward a tangential relationship with said wall for creating a rotational movement of air within said chamber.

References Cited

UNITED STATES PATENTS

| | | | |
|---|---|---|---|
| 2,250,697 | 7/1941 | Bassett | 264—124 |
| 2,773,284 | 12/1956 | Kelly | 18—30 |
| 2,951,260 | 9/1960 | Harrison et al. | 18—5 X |
| 3,099,045 | 7/1963 | Honkanen | 264—51 X |
| 3,139,466 | 6/1964 | Couchman | 18—5 X |
| 3,150,025 | 9/1964 | Slayter et al. | 264—123 X |
| 3,158,898 | 12/1964 | Northrup et al. | 18—5 |
| 3,162,705 | 12/1964 | Smucker et al. | 264—53 |
| 3,165,570 | 1/1965 | Deutsch | 264—121 X |
| 3,167,811 | 2/1965 | Kraus et al. | 18—5 |
| 3,178,491 | 4/1965 | Dart | 264—53 |

FOREIGN PATENTS 227,388  4/1962  Austria.

J. SPENCER OVERHOLSER, *Primary Examiner.*

WILBUR L. McBAY, ALFRED L. LEAVITT,
*Examiners.*

P. E. ANDERSON, *Assistant Examiner.*